(12) United States Patent
Jyu et al.

(10) Patent No.: US 8,102,519 B2
(45) Date of Patent: Jan. 24, 2012

(54) SYSTEM AND METHOD FOR MEASURING DISPERSION

(75) Inventors: Siao-Shan Jyu, Kaohsiung County (TW); Yin-Chieh Lai, Taichung (TW); Shiou-Fong Liu, Taichung County (TW); Wei-Wei Hsiang, Taipei (TW); Hon-Chieh Chang, Kaohsiung County (TW)

(73) Assignee: National Chung Tung University, Hsinchu (TW)

( * ) Notice: Subject to any disclaimer, the term of this patent is extended or adjusted under 35 U.S.C. 154(b) by 120 days.

(21) Appl. No.: 12/790,876

(22) Filed: May 31, 2010

(65) Prior Publication Data

US 2010/0309456 A1 Dec. 9, 2010

(30) Foreign Application Priority Data

Jun. 4, 2009 (TW) .............................. 98118609 A (51) Int. Cl.
*G01N 21/00* (2006.01)

(52) U.S. Cl. ..................................................... 356/73.1

(58) Field of Classification Search ........................ None
See application file for complete search history.

(56) References Cited

U.S. PATENT DOCUMENTS

| 6,573,985 B2 | 6/2003 | Ibukuro et al. |
| 6,580,500 B2 | 6/2003 | Aoki et al. |
| 6,587,190 B2 * | 7/2003 | Chae et al. ................... 356/73.1 |
| 6,734,955 B2 | 5/2004 | Wight et al. |
| 6,738,542 B1 * | 5/2004 | Doran et al. ................... 385/24 |
| 6,771,360 B2 | 8/2004 | Kawabata |
| 2004/0156038 A1 | 8/2004 | Cao |
| 2006/0244972 A1 | 11/2006 | Fercher |

FOREIGN PATENT DOCUMENTS

TW    I243892    11/2005

OTHER PUBLICATIONS

L. G. Cohen, "Comparison of Single-Mode Fiber Dispersion Measurement Techniques," Journal of Lightwave Technology, vol. (LT-3), No. (5) (1959).

J. M. Wiesenfeld and J. Stone, "Measurement of Dispersion Using Short Lengths of an Optical Fiber and Picosecond Pulses from Semiconductor Film Lasers," Journal of Lightwave Technology, vol. (LT-2), No. (4) (1984).

(Continued)

*Primary Examiner* — Tu Nguyen
(74) *Attorney, Agent, or Firm* — CKC & Partners Co., Ltd.

(57) ABSTRACT

A method for measuring dispersion in an optical fiber is provided and includes the following steps. A periodic wavelength variation pulse light signal is generated by a periodic frequency-swept pulse light source, in which the periodic wavelength variation pulse light signal has periodic wavelength variations. The periodic wavelength variation pulse light signal is transmitted into a test optical fiber. The periodic wavelength variation pulse light signal propagating through the test optical fiber is detected to generate a sensing signal. The sensing signal is transformed into an RF spectrum to obtain a slow periodic pulse timing variation of the periodic wavelength variation pulse light signal in accordance with the RF spectrum. A dispersion value of the test optical fiber is obtained in accordance with the slow periodic pulse timing variation. A system for measuring dispersion in a fiber is also disclosed herein.

18 Claims, 5 Drawing Sheets

OTHER PUBLICATIONS

C. Palavicini, Y. Jaouën, and G. Debarge, "Phase-sensitive optical low-coherence reflectometry technique applied to the characterization of photonic crystal fiber properties," Optics Letters, vol. (30), No. (4) (2005).

P. Merritt, R. P. Tatam, and D. A. Jackson, "Interferometric Chromatic Dispersion Measurements on Short Lengths of Monomode Optical Fiber," Optics Letters, vol. (7), No. (4) (1989).

T. N. Nguyen, T. Chartier, M. Thual, P. Besnard, L. Provino, A. Monteville and N. Traynor, "Simultaneous measurement of anomalous group-velocity dispersion and nonlinear coefficient in optical fibers using soliton-effect compression," Optics Communications, vol. (278), pp. 60-65 (2007).

* cited by examiner

SYSTEM AND METHOD FOR MEASURING DISPERSION

RELATED APPLICATIONS

This application claims priority to Taiwan Patent Application Serial Number 98118609, filed Jun. 4, 2009, which is herein incorporated by reference.

BACKGROUND

1. Technical Field

The present disclosure relates to a method for measuring dispersion in an optical fiber. More particularly, the present disclosure relates to a method of using a periodic wavelength variation pulse light signal to measure dispersion in an optical fiber.

2. Description of Related Art

Conventionally, dispersion or group velocity dispersion (GVD) would cause a group velocity of the light to have different pulse time delays due to the light having different wavelengths when the light propagates in a transmission medium (e.g. optical fiber) having none-zero dispersion value. In other words, during the light propagation inside a dispersive fiber, the light pulse may broaden due to the fiber dispersion effect in the transmission medium. Thus, for the optical fiber communication applications, the group velocity dispersion will cause neighboring signals to overlap with each other, thus limiting the maximum data transmission speed. Therefore, how the dispersion in the optical fiber can be measured such that it can be compensated or applied is an essential issue.

In prior art, there are some methods for measuring the group velocity dispersion, such as time of flight (TOF) technique, temporal interferometry technique, spectrum interferometry technique, phase-shift modulation (MPS) technique, and so on. However, the foregoing methods are usually restricted by response time of detectors, disturbance of circumstances, modulating frequency of modulators or measuring sensitivity, thus the group velocity dispersion cannot be measured more accurately by inexpensive measuring apparatuses.

SUMMARY

An object of the present invention is to provide a method for measuring dispersion in an optical fiber, so as to easily and conveniently measure the is dispersion in the optical fiber.

Another object of the present invention is to provide a measuring system, so as to utilize measuring apparatuses with low costs to measure dispersion in an optical fiber.

In accordance with one embodiment of the present invention, a method for measuring dispersion in an optical fiber is provided. A periodic wavelength variation pulse light signal is generated by a periodic frequency-swept pulse light source, in which the periodic wavelength variation pulse light signal has periodic wavelength variations. The periodic wavelength variation pulse light signal is transmitted into a test optical fiber. The periodic wavelength variation pulse light signal propagating through the test optical fiber is detected to generate a sensing signal. The sensing signal is transformed into an RF spectrum to obtain a slow periodic pulse timing variation of the periodic wavelength variation pulse light signal in accordance with the RF spectrum. A dispersion value of the test optical fiber is obtained in accordance with the slow periodic pulse timing variation.

In accordance with another embodiment of the present invention, a measuring system for measuring dispersion in an optical fiber is provided. The measuring system comprises a periodic frequency-swept pulse light source, a test optical fiber, a photo sensor, an RF spectrum analyzer and a computing device. The periodic frequency-swept pulse light source is configured for generating a periodic wavelength variation pulse light signal having periodic wavelength variations. The test optical fiber is coupled to the periodic frequency-swept pulse light source and configured for receiving the periodic wavelength variation pulse light signal. The photo sensor is coupled to the test optical fiber and configured for detecting the periodic wavelength variation pulse light signal propagating through the test optical fiber to generate a sensing signal. The RF spectrum analyzer is coupled to the photo sensor and configured for transforming the sensing signal into an RF spectrum to obtain a slow periodic pulse timing variation of the periodic wavelength variation pulse light signal in accordance with the RF spectrum. The computing device is configured performing computing to obtain a dispersion value of the test optical fiber in accordance with the slow periodic pulse timing variation.

According to the foregoing embodiments of the present invention, the measuring system and method can be applied not only to measure the dispersion in the optical fiber in an efficient and cost-saving manner, but also make the measurement not apt to be restricted by response time of detectors, disturbance of circumstances, characteristics of modulators, or measuring sensitivity.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

The terms used in this specification generally have their ordinary meanings in the art and in the specific context where each term is used. The use of examples anywhere in this specification, including examples of any terms discussed herein, is illustrative only, and in no way limits the scope and meaning of the invention or of any exemplified term. Likewise, the present invention is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
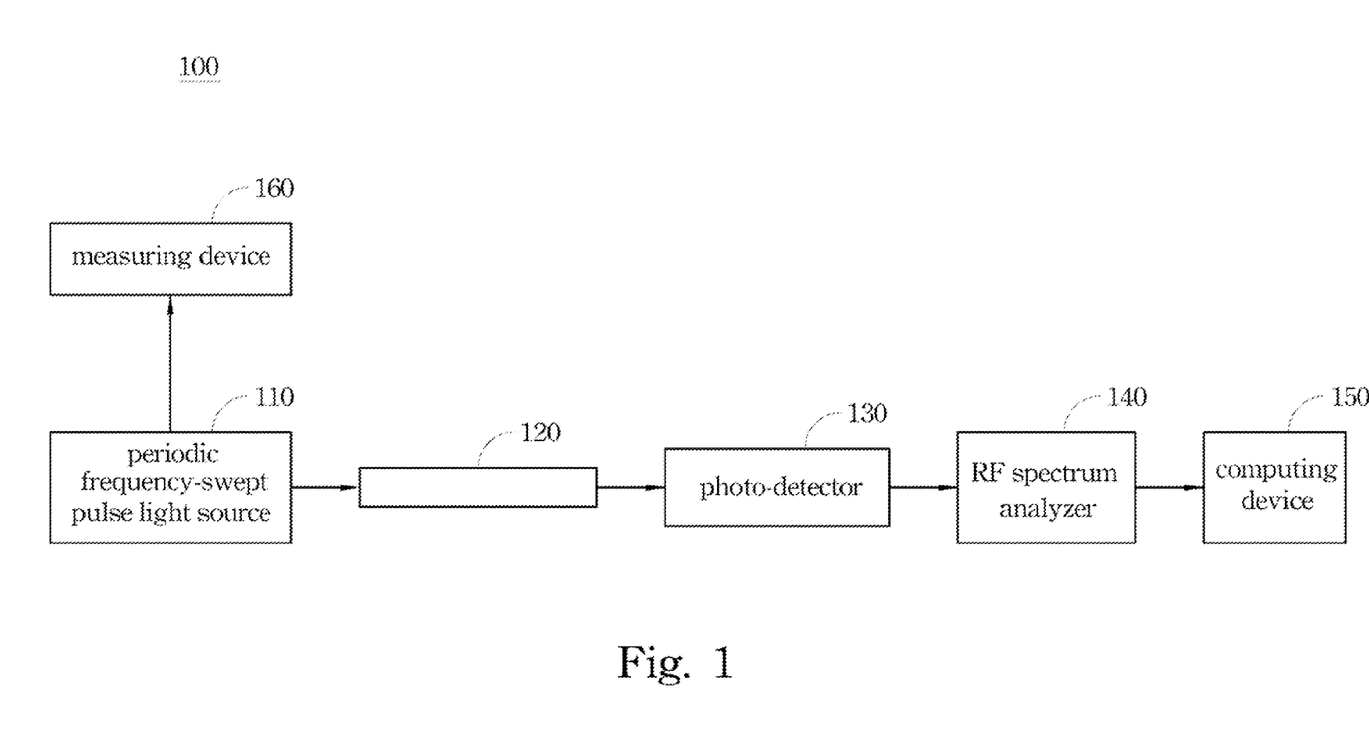
FIG. 1 is a block diagram of a measuring system according to one embodiment of the present invention.

FIG. 1 is a block diagram of a measuring system according to one embodiment of the present invention. The measuring system 100 is provided for measuring dispersion or group velocity dispersion (GVD) in an optical fiber and includes a periodic frequency (wavelength)-swept pulse light source 110, a test optical fiber 120, a photo sensor 130, an RF spectrum analyzer 140 and a computing device 150. The periodic frequency-swept pulse light source 110 generates a periodic wavelength variation pulse light signal, in which the periodic wavelength variation pulse light signal has periodic wavelength variations. The periodic frequency-swept pulse light source 110 can be a laser light source generated by an asynchronous mode-locked (ASM) optical fiber soliton laser (or called asynchronous mode-locked laser) with frequency sinusoidal sweeping, a tunable laser having wavelengths with frequency sweeping or frequency hopping, or a dual-frequency periodic switching frequency shift keying (FSK) modulation system.

The test optical fiber 120 is coupled to the periodic frequency-swept pulse light source 110 and receives the periodic wavelength variation pulse light signal generated by the periodic frequency-swept pulse light source 110. The photo sensor 130 is coupled to the test optical fiber 120 and detects the periodic wavelength variation pulse light signal propagating through the test optical fiber 120 to generate a sensing signal, in which the photo sensor 130 can be a photodiode.

The RF spectrum analyzer 140 is coupled to the photo sensor 130 and transforms the sensing signal generated by the photo sensor 130 into an RF spectrum to obtain a slow periodic pulse timing variation of the periodic wavelength variation pulse light signal in accordance with the RF spectrum. The computing device 150 performs computing in accordance with the obtained slow periodic pulse timing variation to obtain a dispersion value of the test optical fiber 120, in which the computing device 150 can be computer.

The periodic wavelength variation pulse light signal generated by the periodic frequency-swept pulse light source 110 would induce the slow periodic pulse timing variation in accordance with the dispersion originally existing in the test optical fiber 120, and the slow periodic pulse timing variation further has a dependent relation with the dispersion value of the test optical fiber 120, such that the dispersion value can be obtained by then analyzing the slow periodic pulse timing variation.

Theoretically, the dispersion value in the optical fiber can be computed by the following equation (1):

$$LD\Delta\lambda = \sqrt{(\delta t_{02})^2 - (\delta t_{01})^2} \qquad \text{eq. (1)}$$

where L represents the length of the test optical fiber 120, D represents the dispersion value of the test optical fiber 120, $\Delta\lambda$ represents the slow periodic wavelength-sweeping magnitude of the periodic frequency-swept pulse light source 110, $\delta t_{01}$ represents a previous slow periodic pulse timing variation originally existing in the periodic frequency-swept pulse light source 110, $\delta t_{02}$ represents a slow periodic pulse timing variation existing in the periodic frequency-swept pulse light source 110 after the periodic frequency-swept pulse light source 110 goes through the test optical fiber 120.

Since the slow periodic wavelength-sweeping (frequency-sweeping) magnitude of the asynchronous mode-locked optical fiber soliton laser with sinusoidal wavelength-sweeping has a phase difference of 90° from the slow periodic timing variation, the timing variation produced due to the dispersion effect in the test optical fiber 120 also has a phase difference of 90° from the original timing variation, and the foregoing equation (1) is thus verified. The computing device 150 computes the previous slow periodic pulse timing variation $\delta t_{01}$, the slow periodic pulse timing variation $\delta t_{02}$, the slow periodic wavelength-sweeping magnitude $\Delta\lambda$ and the length L of the test optical fiber 120 to obtain the dispersion value D of the test optical fiber 120.

As mentioned above, in order to obtain the dispersion value D of the test optical fiber 120, except the slow periodic pulse timing variation $\delta t_{02}$ measured after the periodic wavelength variation pulse light signal propagates through the test optical fiber 120 should be obtained, the previous slow periodic pulse timing variation $\delta t_{01}$ originally existing in the periodic frequency-swept pulse light source 110 and the slow periodic wavelength-sweeping magnitude $\Delta\lambda$ also must be measured.

For the previous slow periodic pulse timing variation $\delta t_{01}$, the photo sensor 130 may detect the periodic wavelength variation pulse light signal to generate a previous sensing signal before the periodic wavelength variation pulse light signal propagates through the test optical fiber 120, and then the RF spectrum analyzer 140 transforms the previous sensing signal into a previous RF spectrum to obtain the previous slow periodic pulse timing variation $\delta t_{01}$ of the periodic wavelength variation pulse light signal in accordance with the previous RF spectrum.

Figure 2:
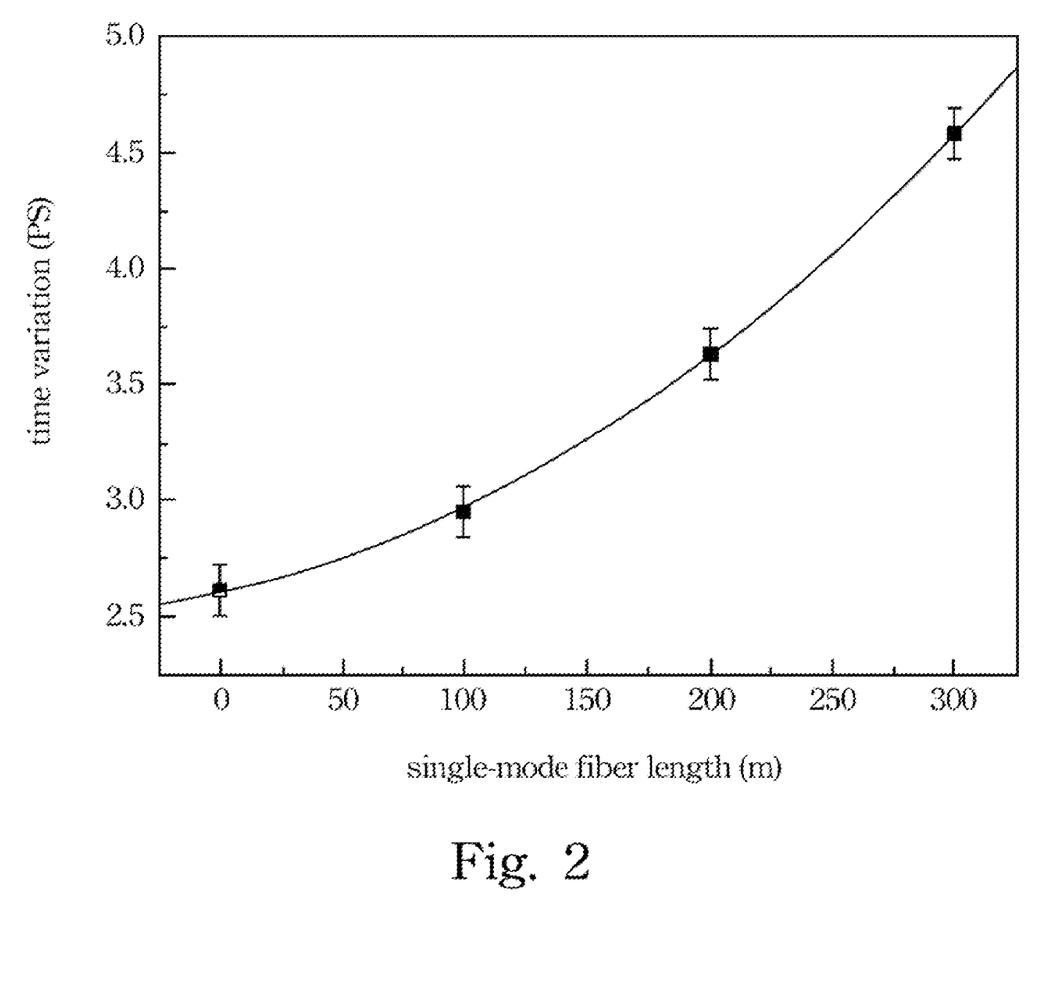
FIG. 2 is a measurement diagram of the timing variation corresponding to fiber length for a single mode fiber (SMF) according to one embodiment of the present invention.

On the other hand, for the slow periodic wavelength-sweeping magnitude $\Delta\lambda$, the measuring system 100 can further include a measuring device 160 for measuring the slow periodic wavelength-sweeping magnitude AA of the periodic frequency-swept pulse light source 110. In one embodiment, an optical fiber with known dispersion value 0 can first be coupled to the periodic frequency-swept pulse light source 110, and then the foregoing manner is used to obtain the values of L, $\delta t_{01}$, and $\delta t_{02}$, such that the equation (1) mentioned above is used to obtain the slow periodic wavelength-sweeping magnitude $\Delta\lambda$. As a result, the math substitution can be done again by using the obtained magnitude $\Delta\lambda$ in the equation (1), so as to acquire the dispersion value D after the value of $\delta t_{02}$ is obtained. FIG. 2 is a measurement diagram of the timing variation corresponding to fiber length for a single mode fiber (SMF) according is to one embodiment of the present invention. Based on the measurement result shown in FIG. 2, not only the equation (1) can be verified, but also the value of $\Delta\lambda$ can thus be ascertained in advance.

During the experimental process of measuring the dispersion, two types of test optical fibers, i.e. dispersion shift fiber (DSF) and dispersion compensate fiber (DCF), are used in the present embodiment. The wavelength-sweeping magnitude is first calibrated and obtained by the single mode fiber with known group velocity dispersion and length. The calibrated wavelength-sweeping magnitude is then used to obtain a group velocity dispersion value of the test optical fiber with known length. The results are shown in the following table I.

TABLE I group velocity dispersion measurement result

| fiber type | fiber length (m) | Δλ (nm) | $\delta t_{01}$ (ps) | $\delta t_{02}$ (ps) | \|D\| (ps/nm/km) |
|---|---|---|---|---|---|
| DSF | 900 | 0.8412 | 5.4852 | 5.9985 | 3.2067 |
| DCF | 47 | 2.0970 | 3.2592 | 8.2382 | 76.7655 |

Theoretically, the foregoing slow periodic pulse timing variation $\delta t_0$ is obtained by first measuring and analyzing the ratio of the main harmonic peak (normally determined by the harmonic cavity frequency) to a first spectral side peak (which has a detuning frequency (5-50 KHz) related to the main peak as shown in the following FIG. 4) in the RF spectrum shown on the RF spectrum analyzer 140 and then computing the measured data. For example, when a 10 GHz asynchronous mode-locked (ASM) optical fiber soliton laser having a slow (5-50 KHz) periodic variation is used, the laser detected by the photo sensor can be used as an electric signal represented by the following equation (2):

$$i(t) = [r(t) \otimes p(t)] \otimes \sum_{m=-\infty}^{m=\infty} \delta[t - mT_H + \delta t_0 \sin(\Delta\omega mT_H)] \quad \text{eq. (2)}$$

and its spectrum representation with Fourier transform can be shown as following:

$$F\{i(t)\} = F\{r(t)\}F\{p(t)\}F\left\{\sum_{m=-\infty}^{m=\infty} \delta(t - mT_H + \delta t_0 \sin(\Delta\omega mT_H))\right\} \propto \quad \text{eq. (3)}$$

$$r(\omega)p(\omega)\sum_{n=-\infty}^{n=\infty} J_n(\omega\delta t_0) \sum_{m=-\infty}^{m=\infty} \delta(\omega - m\omega_H + n\Delta\omega)$$

From the equation (3), the RF spectrum displayed on the RF spectrum analyzer shows the main peak and the side peaks, and the ratio of the main harmonic peak to the first spectral side peak can be represented by the following equation (4):

$$\Delta = \left|\frac{J_0(\omega_H \delta t_0)}{J_1[(\omega_H + \Delta\omega)\delta t_0]}\right|^2 \cong \left|\frac{J_0(\omega_H \delta t_0)}{J_1(\omega_H \delta t_0)}\right|^2 \quad \text{eq. (4)}$$

Thus, if the ratio Δ of the main harmonic peak to the first spectral side peak is known, the slow periodic pulse timing variation $\delta t_0$ can be obtained.

Figure 3:
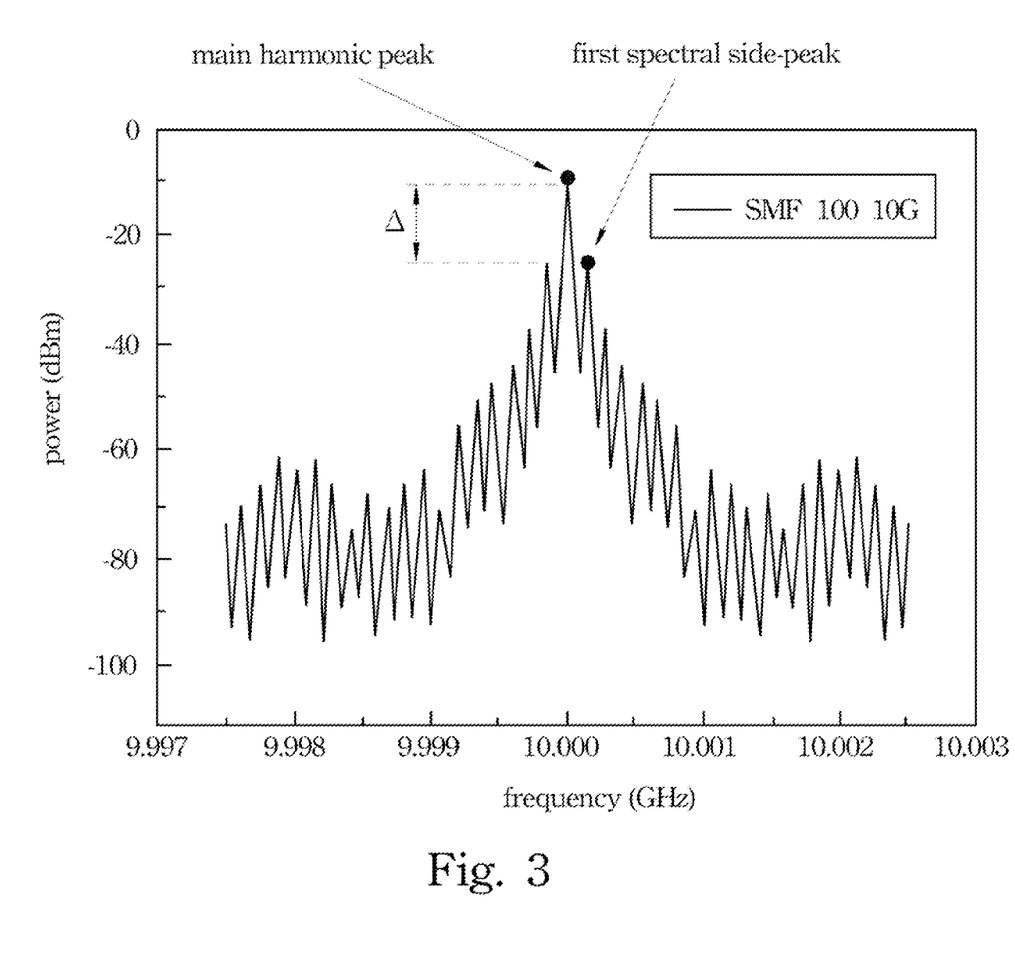
FIG. 3 is a typical RF spectrum measured by the RF spectrum analyzer in FIG. 1.

FIG. 3 is a typical RF spectrum measured by the RF spectrum analyzer in FIG. 1. As known from the equation (3), the RF spectrum would show the side peaks as shown in FIG. 3, and the ratio Δ of the main harmonic peak to the first spectral side peak obtained from the equation (4) can be measured from the RF spectrum shown in FIG. 3. Specifically, when the RF spectrum analyzer 140 receives the sensing signal from the photo sensor 130, the RF spectrum shown in FIG. 3 would be displayed on the RF spectrum analyzer 140, and the ratio Δ of the main harmonic peak to the first spectral side peak can be known from the RF spectrum shown in FIG. 3. As a result, the periodic pulse timing variation can be computed and obtained in accordance with the ratio Δ of the main harmonic peak to the first spectral side peak.

Figure 4:
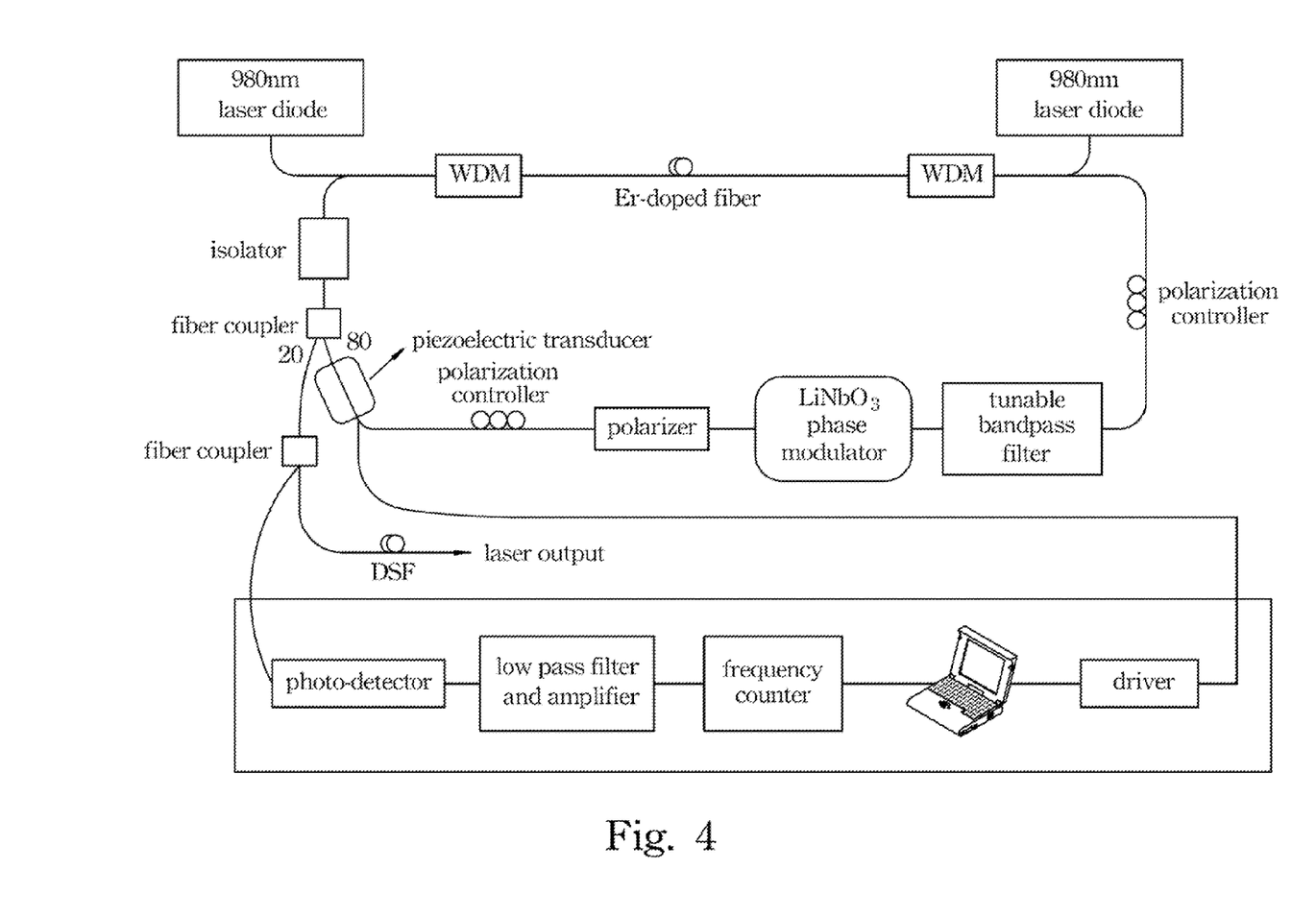
FIG. 4 is a system diagram of the asynchronous mode-locked (ASM) optical fiber soliton laser with sinusoidal wavelength-sweeping according to one embodiment of the present invention.

FIG. 4 is a system diagram of the asynchronous mode-locked (ASM) optical fiber soliton laser with sinusoidal wavelength-sweeping according to one embodiment of the present invention. The laser outputted by the system is used as the periodic frequency-swept pulse light source 110 shown in FIG. 1 and is an active-passive hybrid mode-locked laser. In the present embodiment, in order to acquire more non-linear effects in the optical fiber cavity, the light strength in the cavity must be large enough. Thus, the present embodiment is carried out by using two laser diodes to transmit the light into an Erbium-doped fiber and to be the bi-directional pump, in which the laser diodes have wavelength of 980 nm and power of 350 mW. After the Erbium-doped fiber is stimulated by the laser diodes with wavelength of 980 nm to be the gain medium required for generating the laser, one end of the Erbium-doped fiber generates a laser signal, and the isolator can make the signals transmit forward in a single direction, so as to prevent from generating spatial hole burning effect.

A fiber coupler is disposed behind the Erbium-doped fiber and separates the laser signals in a ratio of 80/20 in order to generate the laser output, and the chirp of the output pulse is compensated by the optical fiber with the group velocity dispersion of negative value. Piezoelectric transducer (PZT) controls the cavity length according to different voltages. Two polarization controllers are disposed respectively at an input of a polarizer and an output of a tunable band-pass filter, so as to modulate the polarization of the light signal such that the light signal is at a state of polarization additive pulse mode-locking (P-APM).

The $LiNbO_3$ electro-optical phase modulator is disposed in a passive mode-locked laser cavity and retains an all-fiber structure, and produces the active mode-locked effect since it is disposed in the resonant ring fiber cavity. Moreover, the $LiNbO_3$ electro-optical phase modulator requires the polarizer disposed at its input such that the polarization axis of the electro-optic crystal can thus be matched. At that moment, since the polarizer and the electro-optical phase modulator have already been capable of providing enough polarization-dependent loss to result in the polarization additive pulse mode-locking (P-APM), the isolator thus processes the laser signal generated at one end of the Erbium-doped fiber in a polarization-independent manner.

The tunable band-pass filter selects the wavelength where the laser stimulates and also can suppress a supermode by self-phase modulation (SPM), so as to achieve a high supermode suppression ratio (SMSR) and a wide bandwidth, to further make shorter the pulse in the cavity.

In addition, the foregoing system further includes a laser feedback mechanism for dynamically controlling the piezoelectric transducer to stabilize the laser cavity length. The laser feedback mechanism includes a photo detector, a low pass filter, an amplifier, a frequency counter, a computer having controlling program (e.g. Labview program), and a driver. After the photo detector receives and transforms the light signal into a low-frequency electric signal, the electric signal is first outputted and transmitted to the amplifier to be amplified and then filtered by the low pass filter to remove unnecessary noise, in order to keep the required signal to be transmitted to the frequency counter. Then, the driver is controlled by the controlling program (e.g. Labview program) in the computer according to the frequency variations in the frequency counter. After that, the voltage of the piezoelectric transducer is controlled by the driver to modulate and stabilize the cavity length and achieve the object of stabilizing the mode-locked laser.

Figure 5:
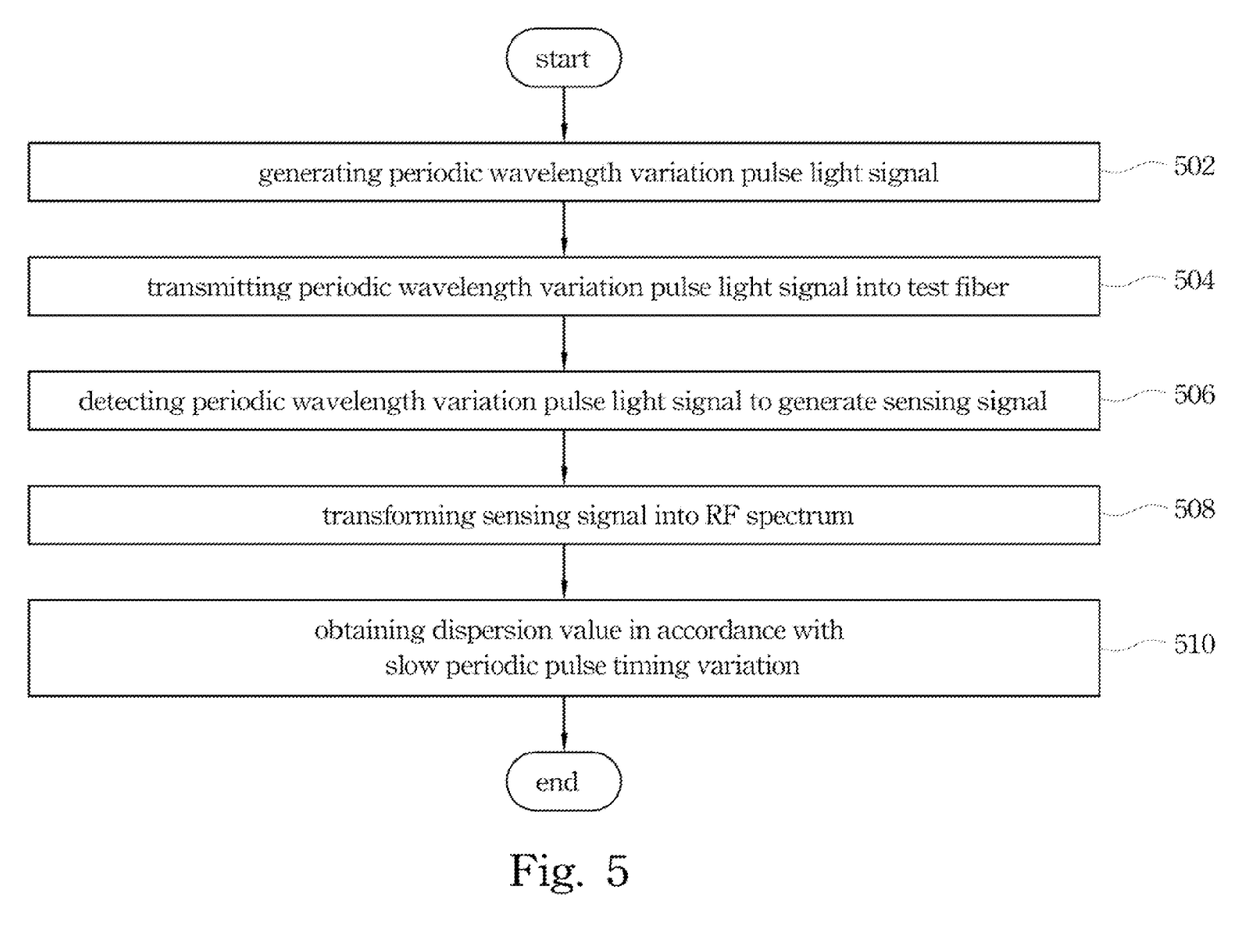
FIG. 5 is a flow chart of a method for measuring dispersion in an optical fiber according to one embodiment of the present invention.

FIG. 5 is a flow chart of a method for measuring dispersion in an optical fiber according to one embodiment of the present invention. Refer to FIG. 1 and FIG. 5. First, the periodic wavelength variation pulse light signal is generated by the periodic frequency-swept pulse light source 110 (Step 502), in which the periodic wavelength variation pulse light signal has periodic wavelength variations. Then, the periodic wavelength variation pulse light signal is transmitted into the test optical fiber 120 (Step 504). After the periodic wavelength variation pulse light signal propagates through the test optical fiber 120, the photo sensor is used to detect the periodic wavelength variation pulse light signal to generate the sensing signal (Step 506). After that, the sensing signal is transformed by the RF spectrum analyzer 140 into the RF spectrum to obtain the slow periodic pulse timing variation of the periodic wavelength variation pulse light signal in accordance with the RF spectrum (Step 508). Then, the dispersion value of the test optical fiber 120 is obtained by the computing device 150 in accordance with the slow periodic pulse timing variation (Step 510).

Furthermore, as mentioned above, in order to obtain the dispersion value of the test optical fiber 120, except the slow periodic pulse timing variation measured after the periodic wavelength variation pulse light signal propagates through the test optical fiber 120 should be obtained, the previous slow periodic pulse timing variation originally existing in the periodic frequency-swept pulse light source 110 and the slow periodic wavelength-sweeping magnitude also must be measured. Thus, although the steps of measuring the length of the test optical fiber 120, the previous slow periodic pulse timing variation and the slow periodic wavelength-sweeping magnitude are saved in FIG. 5, in practice it is still necessary to obtain the length of the test optical fiber 120, the previous slow periodic pulse timing variation and the slow periodic wavelength-sweeping magnitude based on the foregoing manner, and then the dispersion value of the test optical fiber 120 can thus be obtained by the computing device 150.

For the foregoing embodiments, the measuring system and method can be applied not only to measure the dispersion in the optical fiber in an efficient and cost-saving manner, but also make the measurement not apt to be restricted by response time of detectors, disturbance of circumstances, characteristics of modulators, or measuring sensitivity.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A method for measuring dispersion in an optical fiber, comprising:
    generating a periodic wavelength variation pulse light signal by a periodic frequency-swept pulse light source, the periodic wavelength variation pulse light signal having periodic wavelength variations;
    transmitting the periodic wavelength variation pulse light signal into a test optical fiber;
    detecting the periodic wavelength variation pulse light signal propagating through the test optical fiber to generate a sensing signal;
    transforming the sensing signal into an RF spectrum to obtain a slow periodic pulse timing variation of the periodic wavelength variation pulse light signal in accordance with the RF spectrum; and
    obtaining a dispersion value of the test optical fiber in accordance with the slow periodic pulse timing variation.

2. The method as claimed in claim 1, further comprising:
    detecting the periodic wavelength variation pulse light signal to generate a previous sensing signal before the periodic wavelength variation pulse light signal propagating through the test optical fiber; and
    transforming the previous sensing signal into a previous RF spectrum to obtain a previous slow periodic pulse timing variation of the periodic wavelength variation pulse light signal in accordance with the previous RF spectrum.

3. The method as claimed in claim 2, further comprising:
    measuring a slow periodic wavelength-sweeping magnitude of the periodic frequency-swept pulse light source.

4. The method as claimed in claim 3, wherein the dispersion value is obtained by computing the previous slow periodic pulse timing variation, the slow periodic pulse timing variation, the slow periodic wavelength-sweeping magnitude and a length of the test optical fiber.

5. The method as claimed in claim 1, wherein the periodic wavelength variation pulse light signal induces the slow periodic pulse timing variation in accordance with the dispersion in the test optical fiber, and the slow periodic pulse timing variation has a dependent relation with the dispersion value of the test optical fiber.

6. The method as claimed in claim 1, wherein the slow periodic pulse timing variation is obtained in accordance with a ratio of a main harmonic peak to a first spectral side peak of the RF spectrum.

7. The method as claimed in claim 1, wherein the periodic frequency-swept pulse light source is a laser light source generated by a sinusoidal sweeping asynchronous mode-locked (ASM) optical fiber soliton laser with wavelength-sinusoidal sweeping, a frequency-sweeping or frequency-hopping tunable laser with an intensity modulator, or a dual-frequency periodic switching frequency shift keying modulation system.

8. The method as claimed in claim 1, wherein the periodic wavelength variation pulse light signal is detected by a photo sensor.

9. The method as claimed in claim 1, wherein the sensing signal is transformed into the RF spectrum by an RF spectrum analyzer.

10. The method as claimed in claim 1, wherein the dispersion value of the test optical fiber is obtained by using a computing device to perform computing.

11. A measuring system for measuring dispersion in an optical fiber, the measuring system comprising:
    a periodic frequency-swept pulse light source for generating a periodic wavelength variation pulse light signal, the periodic wavelength variation pulse light signal having periodic wavelength variations;
    a test optical fiber coupled to the periodic frequency-swept pulse light source, for receiving the periodic wavelength variation pulse light signal;
    a photo sensor coupled to the test optical fiber, for detecting the periodic wavelength variation pulse light signal propagating through the test optical fiber to generate a sensing signal;
    an RF spectrum analyzer coupled to the photo sensor, for transforming the sensing signal into an RF spectrum to obtain a slow periodic pulse timing variation of the periodic wavelength variation pulse light signal in accordance with the RF spectrum; and a computing device for performing computing to obtain a dispersion value of the test optical fiber in accordance with the slow periodic pulse timing variation.

12. The measuring system as claimed in claim 11, wherein the photo sensor detects the periodic wavelength variation pulse light signal to generate a previous sensing signal before the periodic wavelength variation pulse light signal propagates through the test optical fiber.

13. The measuring system as claimed in claim 12, wherein the RF spectrum analyzer transforms the previous sensing signal into a previous RF spectrum to obtain a previous slow periodic pulse timing variation of the periodic wavelength variation pulse light signal in accordance with the previous RF spectrum.

14. The measuring system as claimed in claim 13, further comprising:

a measuring device for measuring a slow periodic wavelength-sweeping magnitude of the periodic frequency-swept pulse light source.

15. The measuring system as claimed in claim 14, wherein the dispersion value is obtained by the computing device computing the previous slow periodic pulse timing variation, the slow periodic pulse timing variation, the slow periodic wavelength-sweeping magnitude and a length of the test optical fiber.

16. The measuring system as claimed in claim 11, wherein the periodic wavelength variation pulse light signal induces the slow periodic pulse timing variation in accordance with the dispersion in the test optical fiber, and the slow periodic pulse timing variation has a dependent relation with the dispersion value of the test optical fiber.

17. The measuring system as claimed in claim 11, wherein the slow periodic pulse timing variation is obtained in accordance with a ratio of a main harmonic peak to a first spectral side peak of the RF spectrum.

18. The measuring system as claimed in claim 11, wherein the periodic frequency-swept pulse light source is a laser light source generated by an asynchronous mode-locked (ASM) optical fiber soliton laser with wavelength-sinusoidal sweeping, a tunable laser having wavelengths with frequency sweeping or frequency hopping, or a dual-frequency periodic switching frequency shift keying modulation system.

* * * * *